United States Patent
Chin et al.

(10) Patent No.: US 9,451,550 B2
(45) Date of Patent: Sep. 20, 2016

(54) POWER AWARENESS MEASUREMENT IN TIME DIVISION SYNCHRONOUS CODE DIVISION MULTIPLE ACCESS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 13/538,594

(22) Filed: Jun. 29, 2012

(65) Prior Publication Data

US 2014/0003257 A1    Jan. 2, 2014

(51) Int. Cl.
*H04W 52/02* (2009.01)
*H04W 24/10* (2009.01)
*H04W 36/00* (2009.01)
*H04W 36/14* (2009.01)

(52) U.S. Cl.
CPC ......... *H04W 52/0261* (2013.01); *H04W 24/10* (2013.01); *H04W 36/0088* (2013.01); *H04W 36/14* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,809,411 B2 | 10/2010 | Arimitsu | |
| 7,813,772 B2 | 10/2010 | Camp, Jr. et al. | |
| 7,898,997 B2 * | 3/2011 | Lee et al. | 370/311 |
| 8,060,153 B2 * | 11/2011 | Jeong et al. | 455/574 |
| 8,554,163 B2 * | 10/2013 | Deshpande et al. | 455/135 |
| 8,886,261 B2 * | 11/2014 | Aerrabotu | 455/574 |
| 2007/0004469 A1 * | 1/2007 | Arimitsu | H04W 52/029 455/574 |
| 2007/0129045 A1 | 6/2007 | Aerrabotu | |
| 2008/0107019 A1 * | 5/2008 | Lee | H04W 36/06 370/229 |
| 2008/0160918 A1 | 7/2008 | Jeong et al. | |
| 2010/0035601 A1 | 2/2010 | Chen et al. | |
| 2011/0136530 A1 * | 6/2011 | Deshpande | H04W 24/10 455/515 |
| 2012/0124088 A1 | 5/2012 | Meshkati et al. | |

OTHER PUBLICATIONS

International Search Report and Written Opinion—PCT/US2013/048745—ISA/EPO—Sep. 5, 2013.
Taiwan Search Report—TW102123033—TIPO—Mar. 19, 2015.

* cited by examiner

*Primary Examiner* — Timothy J Weidner
(74) *Attorney, Agent, or Firm* — Kristine U. Ekwueme

(57) ABSTRACT

A user equipment may save power by reducing certain battery draining activities when the battery power remaining in the UE fails to meet a threshold value. The UE may skip inter-radio access technology measurements to conserve battery life when the battery power in the UE fails to meet the threshold. The UE may also extend inter-radio access technology measurement periodicity when the battery power in the UE fails to meet the threshold.

12 Claims, 6 Drawing Sheets

POWER AWARENESS MEASUREMENT IN TIME DIVISION SYNCHRONOUS CODE DIVISION MULTIPLE ACCESS

BACKGROUND

1. Field

Aspects of the present disclosure relate generally to wireless communication systems, and more particularly, to power awareness measurement in time division synchronous code division multiple access.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes determining when a remaining battery power of a UE is lower than a first threshold value. The method may also include increasing a periodicity of inter-radio access technology (inter-RAT) measurements when the battery power is lower than the first threshold value.

According to another aspect of the present disclosure, an apparatus for wireless communication includes means for determining when a remaining battery power of a UE is lower than a first threshold value. The apparatus may also include means for increasing a periodicity of inter-radio access technology (inter-RAT) measurements when the battery power is lower than the first threshold value.

According to one aspect of the present disclosure, a computer program product for wireless communication in a wireless network includes a computer readable medium having non-transitory program code recorded thereon. The program code includes program code to determine when a remaining battery power of a UE is lower than a first threshold value. The program code also includes program code to increase a periodicity of inter-radio access technology (inter-RAT) measurements when the battery power is lower than the first threshold value.

According to one aspect of the present disclosure, an apparatus for wireless communication includes a memory and a processor(s) coupled to the memory. The processor(s) is configured to determine when a remaining battery power of a UE is lower than a first threshold value. The processor(s) is further configured to increase a periodicity of inter-radio access technology (inter-RAT) measurements when the battery power is lower than the first threshold value.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
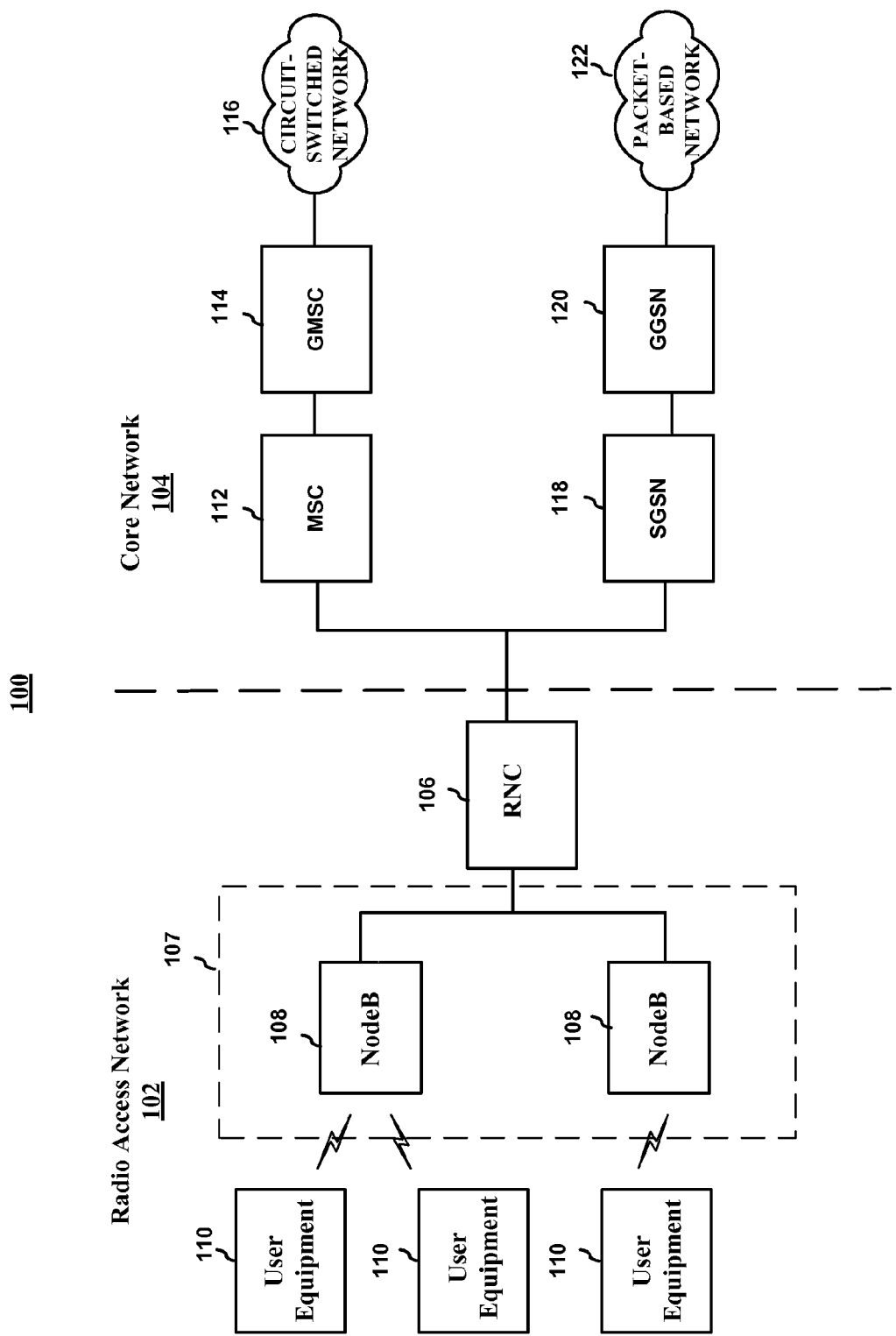
FIG. 1 is a block diagram conceptually illustrating an example of a telecommunications system.

Turning now to FIG. 1, a block diagram is shown illustrating an example of a telecommunications system 90. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
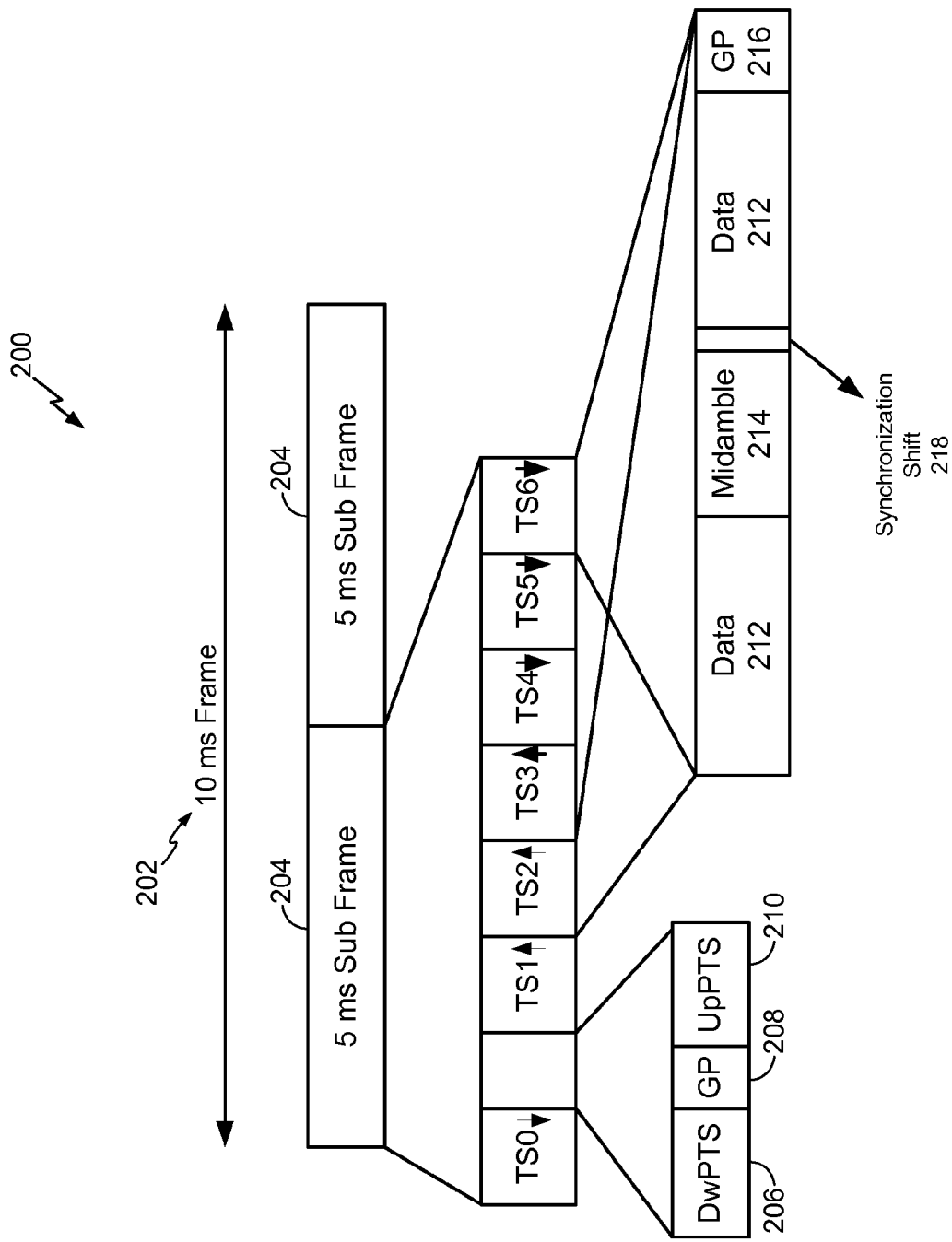
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
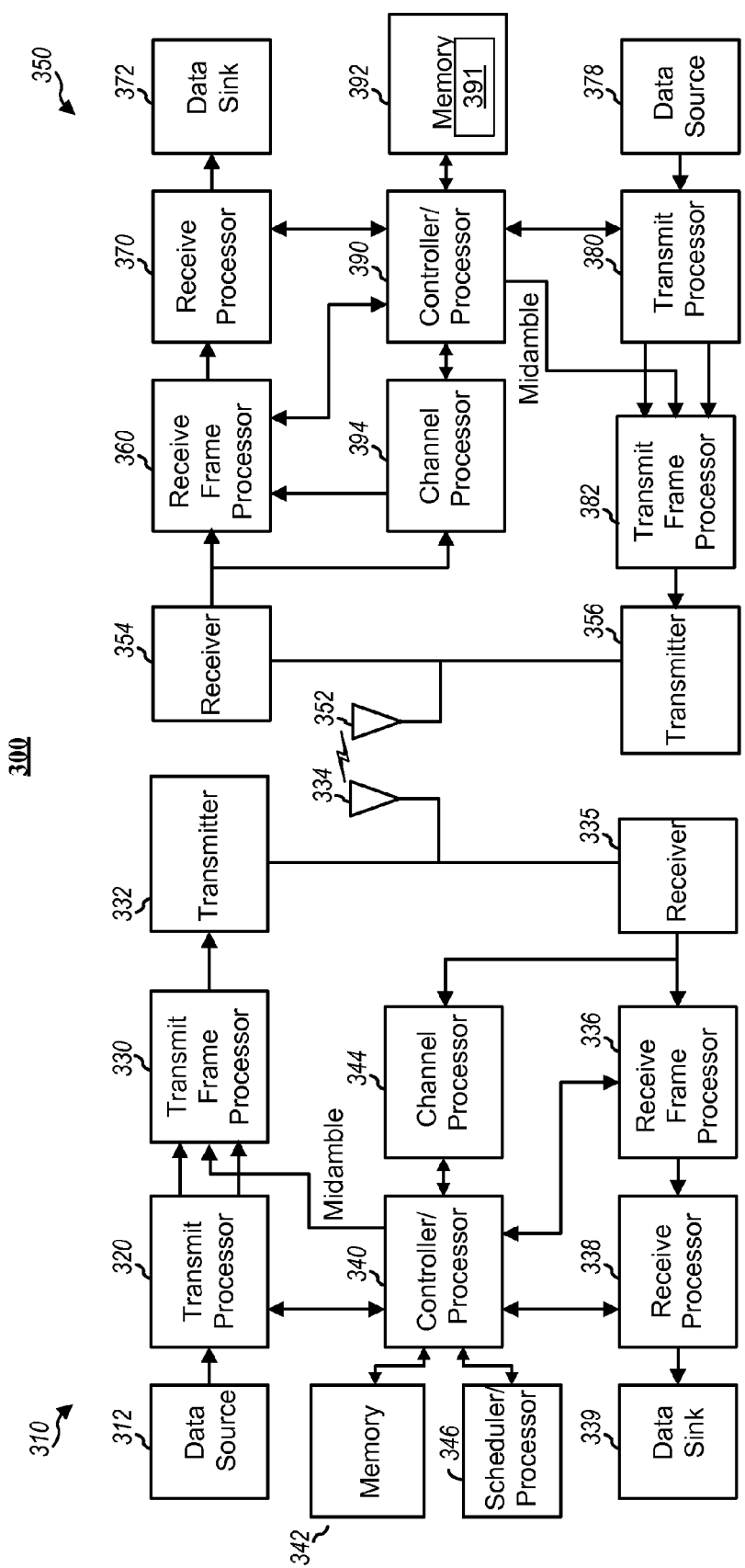
FIG. 3 is a block diagram conceptually illustrating an example of a node B in communication with a UE 350 in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The processor 340/390 and/or other processors and modules at the node B 310/UE 350 may perform or direct the execution of the functional blocks illustrated in FIG. 5. The computer readable media of memories 342 and 392 may store data and software for the node B 310 and the UE 350, respectively. For example, the memory 392 of the UE 350 may store power awareness measurement module 391 which, when executed by the controller/processor 390, configures the UE 350 for building high speed shared information control channels (HS-SICHS) in multi-carrier time division high speed downlink packet access (HSDPA) systems as described. A scheduler/processor 346 at the node B 310 may be used to allocate resources to the UEs and schedule downlink and/or uplink transmissions for the UEs.

Figure 4:
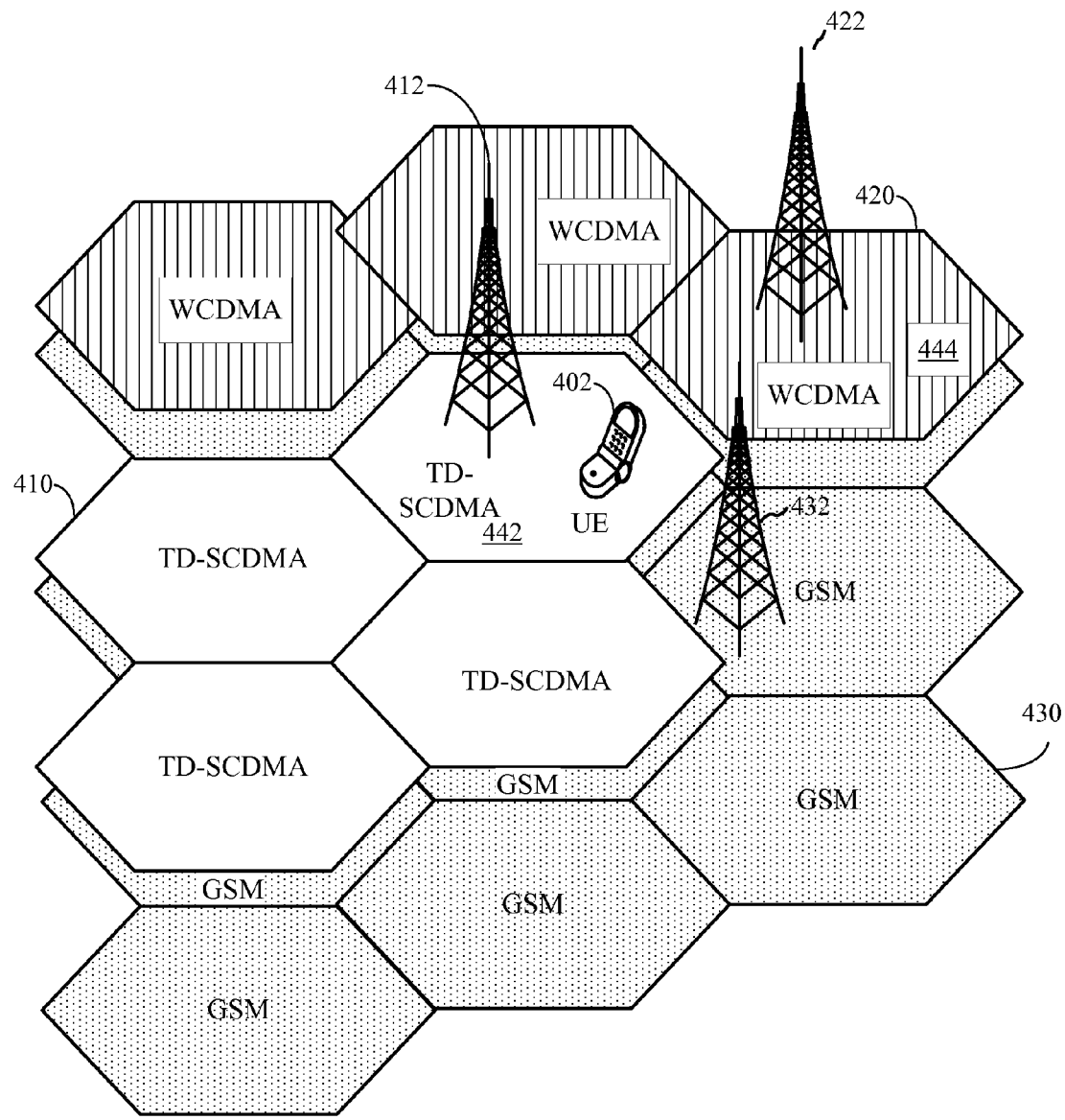
FIG. 4 illustrates a geographical area with coverage from three radio access technologies according to one aspect of the present disclosure.

Deployment of a TD-SCDMA network may not provide complete geographic coverage in certain areas during the migration, e.g., from 2G to 3G or from 3G to 4G, Radio Access Technologies (RATs). In areas where TD-SCDMA networks are deployed, other networks (such as WCDMA and Global System for Mobile Communications (GSM)) may also have a geographical presence. FIG. 4 illustrates a geographical area with coverage from three radio access technologies according to one aspect. In this deployment of a network, e.g., TD-SCDMA systems, the UE may be in the vicinity of the TD-SCDMA network but continue to perform inter-radio access technology (inter-RAT) measurement of other radio access technologies, e.g., GSM, WCDMA or LTE network. This measurement may be implemented for a cell or base station reselection procedure from the TD-SCDMA cell to the GSM/WCDMA/LTE cell. Inter-RAT measurement may be implemented, for example, due to limited coverage of TD-SCDMA or when the UE 350 desires a better RAT, e.g., LTE, for higher data rate during transmission.

A first network coverage area 410 partially overlaps with a second network coverage area 420 and a third network coverage area 430. In one aspect, the first network coverage area 410 is a TD-SCDMA network, the second network coverage area 420 is a WCDMA network, and the third network coverage area 430 is a GSM network. Thus, a multimode UE 402 may benefit from being able to communicate with the TD-SCDMA network 410, the WCDMA network 420, and the GSM network 430. According to one aspect, the multimode UE 402 may communicate with a TD-SCDMA NB 412, a WCDMA BTS 422, and/or a GSM BTS 432. For example, the multimode UE 402 may have several Subscriber Identity Modules (SIMs): one SIM for WCDMA, one SIM for TD-SCDMA, and one SIM for GSM.

Generally, the different networks may have certain advantages and disadvantages. For example, the GSM network 430 provides matured circuit-switched services, which is advantageous for voice calls. That is, the GSM network 430 may offer more network coverage to allow un-disrupted voice call services in handovers. As another example, the WCDMA network 420 and the TD-SCDMA network 410 provide high performance packet-switched services, which is advantageous for data calls. That is, the WCDMA network 420 and the TD-SCDMA network 410 may offer higher data rates for data call services.

As the UE 402 moves from an old geographical area 442 to a new geographical area 444, the UE 402 may be in communication with a first type of network and handover to a different type of network. For example, the UE 402 may move from the TD-SCDMA network 410 in an old geographical area 442 to a new geographical area 444, which offers the GSM network 430 and the WCDMA network 420. When multiple networks are available in the new geographical area 444, the UE 402 selects one of the networks as the target RAT for inter-RAT handover of the UE 402.

Power Awareness Measurement in Time Division Synchronous Code Division Multiple Access During wireless communication, user equipments (UEs) 350 may be sporadically active and may remain idle for significant periods of time when no call is in progress. However, to ensure that any message directed to the UE 350 is received, the UE 350 periodically monitors the communication channel for messages (e.g., paging messages or signals transmitted by a base station 310), even while the UE is idle. The messages may include those for alerting the UE 350 to the presence of an incoming call, those for updating system parameters in the UE 350, and/or instructions for measuring signals of radio access technologies (RAT) of neighboring base stations (i.e., inter-RAT measurements).

To reduce power consumption in a UE 350 operating in idle mode, the UE 350 may periodically enter an active state during which it may receive messages on a paging channel from the base stations 310 with which it has previously established communication. The paging channel may be divided into numbered frames (e.g., frames 0 through 1023) and the UE 350 may be assigned one or more frames by the base stations 310. Thereafter, the UE 350 may awaken from an inactive state prior to its assigned frame, monitor the paging channels for messages, and revert to the inactive state if additional communication is not desired. Thus, the UE 350 monitors paging messages from the base station 310 informing the UE 350 of possible incoming transmissions. In the time period between successive active states, the UE 350 is in the inactive state and the base station 310 does not send any messages to the UE 350. The time between two consecutive paging message is called a discontinuous receive (DRX) period or cycle. In the inactive state, as much circuitry as possible may be powered down to conserve power.

During the wireless communication, UEs 350 may desire to measure the signal of radio access technologies (RATs) of neighboring base stations 310 in a discontinuous receive (DRX) cycle after monitoring the paging channel. Such inter-RAT measurements may be made at specified time periods or during certain situations or conditions that trigger the inter-RAT measurements. The UE 350 may perform inter-RAT measurements of other radio access technologies (e.g., TD-SCDMA or GSM) supported by a neighboring base station when a UE 350 receives a neighbor list message indicating the nearby RATs.

During idle mode, a UE 350 may continue to consume power to perform inter-RAT measurements. Many UEs 350 are portable and powered by an internal battery. The inter-RAT measurement power consumption by the UE 350 in the idle mode decreases the available battery resources. As a result, it is may be desirable to reduce power consumption in the UE 350 in the idle state to increase battery life.

In one aspect of the present disclosure, when the battery power remaining in the UE 350 fails to meet a first threshold value, the UE 350 skips inter-RAT measurements (e.g., inter-RAT measurements of GSM from TD-SCDMA). For example, the UE 350 skips inter-RAT measurements when the battery power is below the first threshold value, e.g., less than twenty percent of the battery life. Skipping or eliminating inter-RAT measurements in such situations may conserve UE 350 battery power and improve performance.

In one aspect of the present disclosure, when battery power remaining in the UE 350 fails to meet a second threshold value, the UE 350 extends or adjusts the inter-RAT measurement periods. In this implementation, the UE 350 may extend the inter-RAT measurement period even when the UE 350 receives inter-RAT measurement instructions from the base station 310 supporting a shorter inter-RAT measurement periods. The first threshold value may be the same or different from the second threshold value. For example, the UE 350 may extend the inter-RAT measurement period when the battery power is less than twenty percent of the battery life or when the battery power is less than ten percent of the battery life. Thus, when battery power remaining in the UE 350 fails to meet the first and/or the second threshold value, the UE 350 may skip inter-RAT measurement and/or extends the inter-RAT measurement period.

In one aspect of the present disclosure, when battery power remaining in the UE 350 fails to meet a third threshold value and when the signal strength of a serving base station 310 is sufficient to support UE 350 communication, the UE 350 skips inter-RAT measurements. For example, the UE 350 may perform inter-RAT measurements when the signal strength of the serving base station 310 is below a signal strength threshold value and when the battery power is below the third threshold value. The third threshold value may be the same or different from the second threshold value or the first threshold value. As a result of the power awareness measurement implementations, the battery power of the UE 350 may be conserved and the UE 350 performance improved.

Figure 5:
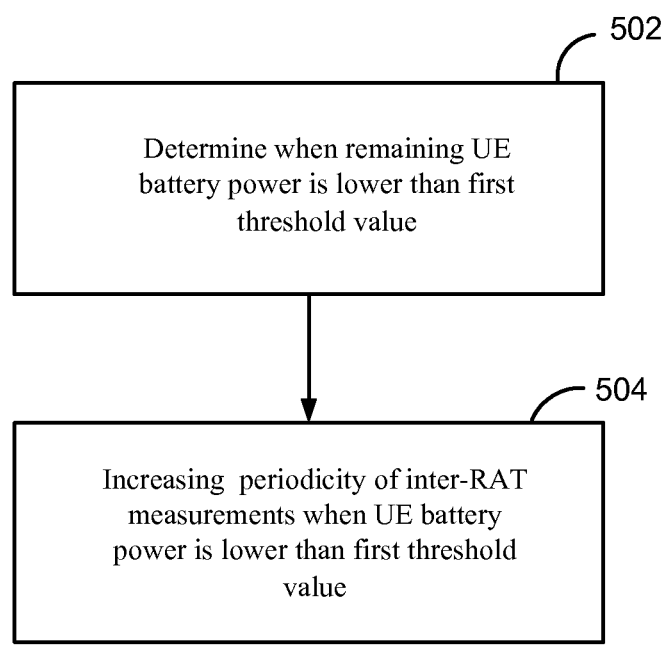
FIG. 5 is a block diagram illustrating a power awareness measurement method for time division synchronous code division multiple access according to one aspect of the present disclosure.

As shown in FIG. 5 a UE may determine when a remaining battery power of a UE is lower than a first threshold value, as shown in block 502. A UE 350 may increase a periodicity of inter-radio access technology (inter-RAT) measurements when the battery power is lower than the first threshold value, as shown in block 504.

Figure 6:
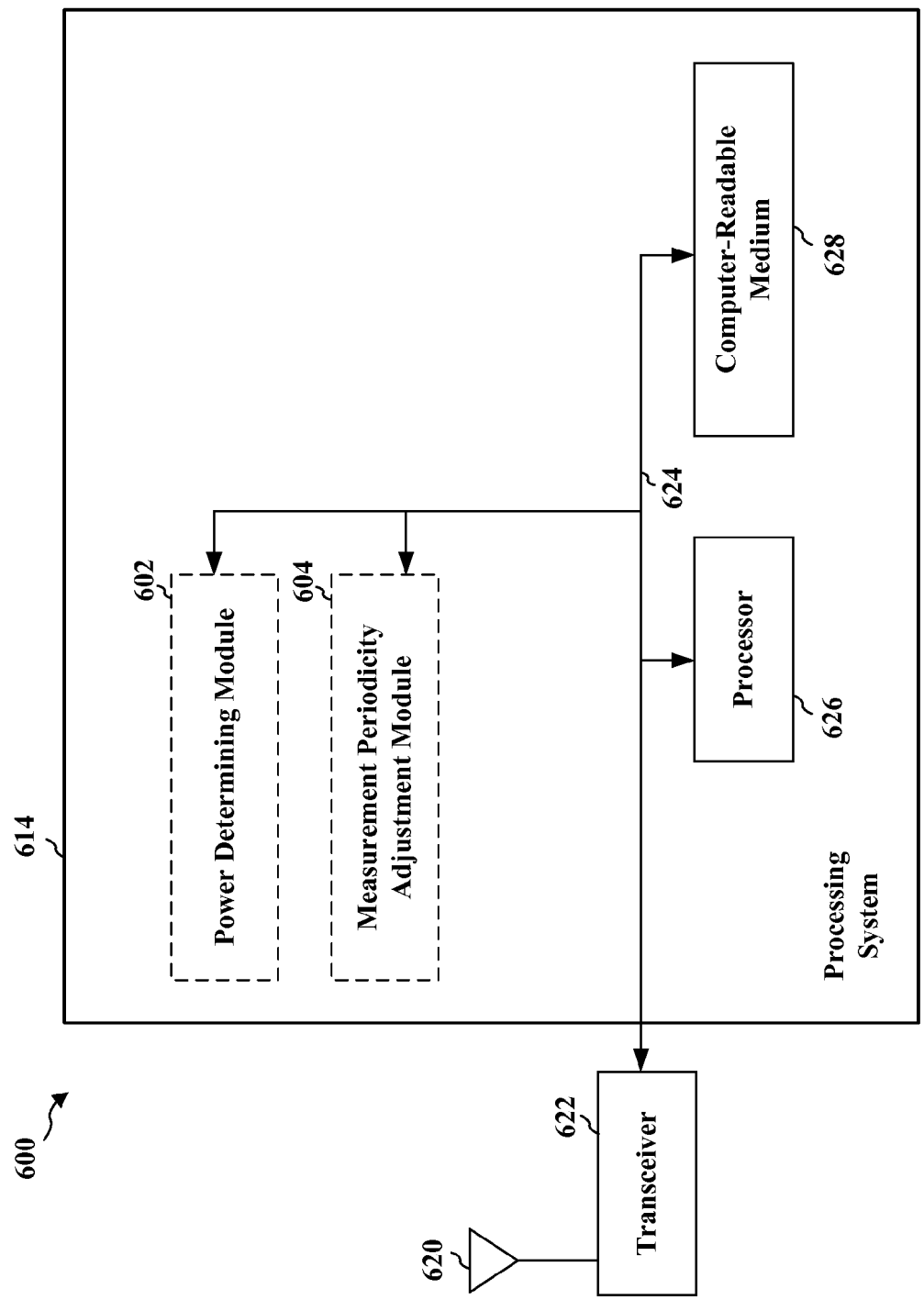
FIG. 6 is a diagram illustrating an example of a hardware implementation for an apparatus employing a processing system.

FIG. 6 is a diagram illustrating an example of a hardware implementation for an apparatus 600 employing a power awareness measurement system 614. The power awareness measurement system 614 may be implemented with a bus architecture, represented generally by a bus 624. The bus 624 may include any number of interconnecting buses and bridges depending on the specific application of the power awareness measurement system 614 and the overall design constraints. The bus 624 links together various circuits including one or more processors and/or hardware modules, represented by a processor 626, a power determining module 602 and a measurement periodicity adjustment module 604, and a computer-readable medium 628. The bus 624 may also link various other circuits such as timing sources, peripherals, voltage regulators, and power management circuits, which are well known in the art, and therefore, will not be described any further.

The apparatus includes the power awareness measurement system 614 coupled to a transceiver 622. The transceiver 622 is coupled to one or more antennas 620. The transceiver 622 provides a means for communicating with various other apparatus over a transmission medium. The power awareness measurement system 614 includes the processor 626 coupled to the computer-readable medium 628. The processor 626 is responsible for general processing, including the execution of software stored on the computer-readable medium 628. The software, when executed by the processor 626, causes the power awareness measurement system 614 to perform the various functions described supra for any particular apparatus. The computer-readable medium 628 may also be used for storing data that is manipulated by the processor 626 when executing software. The power awareness measurement system 614 further includes the power determining module 602 for determining when a remaining battery power of a UE is lower than a first threshold value, and the measurement periodicity adjustment module 604 for increasing a periodicity of inter-radio access technology (inter-RAT) measurements. The power determining module 602 and the measurement periodicity adjustment module 604 may be software modules running in the processor 626, resident/stored in the computer-readable medium 628, one or more hardware modules coupled to the processor 626, or some combination thereof. The power awareness measurement system 614 may be a component of the UE 350 and may include the memory 392 and/or the processor 390.

In one configuration, the apparatus 600 for wireless communication includes means for determining. The means may be the power determining module 602, the power awareness measurement module 391, the memory 392, the processor 390 and/or the power awareness measurement system 614 of the apparatus 600 configured to perform the functions recited by the measuring and recording means. As described above, the power awareness measurement system 614 may include the memory 392 and/or the processor 390. In another aspect, the aforementioned means may be any module or any apparatus configured to perform the functions recited by the aforementioned means.

In one configuration, the apparatus 600 for wireless communication includes means for increasing. The means may be the measurement periodicity adjustment module 604, the power awareness measurement module 391, the memory 392, the processor 390 and/or the power awareness measurement system 614 of the apparatus 600 configured to perform the functions recited by the means. As described above, the power awareness measurement system 614 may include the memory 392 and/or the processor 390. In another aspect, the aforementioned means may be any module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining when a remaining battery power of a user equipment (UE) is lower than a first threshold value and a second threshold value, the first threshold value differing from the second threshold value;
   receiving inter-radio access technology (IRAT) measurement instructions from a base station for measuring signals of neighboring base stations;
   comparing a serving cell signal strength with a third threshold value when the remaining battery power fails to meet the second threshold value;
   eliminating IRAT measurements when the remaining battery power is lower than the first threshold value; and
   extending a periodicity of the IRAT measurements when the remaining battery power is lower than the second threshold value and when the serving cell signal strength is larger than the third threshold value even when the IRAT measurement instructions support a shorter IRAT measurement period.

2. The method of claim 1, in which the determining and the extending occur when the UE is in idle mode.

3. The method of claim 1, in which the IRAT measurements are of a Global System for Mobile Communications (GSM) network and performed by a user equipment connected to a Time Division-Synchronous Code Division Multiple Access (TD-SCDMA) network.

4. An apparatus for wireless communication, comprising:
   means for determining when a remaining battery power of a user equipment (UE) is lower than a first threshold value and a second threshold value, the first threshold value differing from the second threshold value;
   means for receiving inter-radio access technology (IRAT) measurement instructions from a base station for measuring signals of neighboring base stations;
   means for comparing a serving cell signal strength with a third threshold value when the remaining battery power fails to meet the second threshold value;
   means for eliminating IRAT measurements when the remaining battery power is lower than the first threshold value; and
   means for extending a periodicity of the IRAT measurements when the remaining battery power is lower than the second threshold value and when the serving cell signal strength is larger than the third threshold value even when the IRAT measurement instructions support a shorter IRAT measurement period.

5. The apparatus of claim 4, in which the determining means further comprises means for determining when the UE is in idle mode and the extending means further comprises means for extending when the UE is in idle mode.

6. The apparatus of claim 4, in which the IRAT measurements are of a Global System for Mobile Communications (GSM) network and performed by a user equipment connected to a Time Division-Synchronous Code Division Multiple Access (TD-SCDMA) network.

7. A computer-readable medium having non-transitory program code recorded thereon, the program code comprising:
   program code to determine when a remaining battery power of a user equipment (UE) is lower than a first threshold value and a second threshold value, the first threshold value differing from the second threshold value;

program code to receive inter-radio access technology (IRAT) measurement instructions from a base station for measuring signals of neighboring base stations;

program code to compare a serving cell signal strength with a third threshold value when the remaining battery power fails to meet the second threshold value;

program code to eliminate IRAT measurements when the remaining battery power is lower than the first threshold value; and program code to extend a periodicity of the IRAT measurements when the remaining battery power is lower than the second threshold value and when the serving cell signal strength is larger than the third threshold value even when the IRAT measurement instructions support a shorter IRAT measurement period.

8. The computer-readable medium of claim 7, in which the program code further comprises program code to determine when the UE is in idle mode and program code to extend the periodicity when the UE is in idle mode.

9. The computer-readable medium of claim 7, further comprising program code to measure IRAT signals of a Global System for Mobile Communications (GSM) network by a user equipment connected to a Time Division-Synchronous Code Division Multiple Access (TD-SCDMA) network.

10. An apparatus for wireless communication, comprising:

a memory; and at least one processor coupled to the memory and configured:

to determine when a remaining battery power of a user equipment (UE) is lower than a first threshold value and a second threshold value, the first threshold value differing from the second threshold value;

to receive inter-radio access technology (IRAT) measurement instructions from a base station for measuring signals of neighboring base stations;

to compare a serving cell signal strength with a third threshold value when the remaining battery power fails to meet the second threshold value;

to eliminate IRAT measurements when the remaining battery power is lower than the first threshold value; and to extend a periodicity of the IRAT measurements when the remaining battery power is lower than the second threshold value and when the serving cell signal strength is larger than the third threshold value even when the IRAT measurement instructions support a shorter IRAT measurement period.

11. The apparatus of claim 10, in which the at least one processor is further configured to determine when the UE is in idle mode and to extend the periodicity when the UE is in idle mode.

12. The apparatus of claim 10, in which the at least one processor is further configured to measure IRAT signals of a Global System for Mobile Communications (GSM) network by a user equipment connected to a Time Division-Synchronous Code Division Multiple Access (TD-SCDMA) network.

* * * * *